(12) United States Patent
Xiao

(10) Patent No.: US 9,516,264 B2
(45) Date of Patent: Dec. 6, 2016

(54) METHODS, DEVICES, AND SYSTEMS FOR CONTROLLING AUDIO AND VIDEO TRANSMISSION CHANNEL

(71) Applicant: TENCENT TECHNOLOGY (SHENZHEN) COMPANY LIMITED, Shenzhen, Guangdong Province (CN)

(72) Inventor: Shi Wei Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/428,455

(22) PCT Filed: Jul. 15, 2014

(86) PCT No.: PCT/CN2014/082251
§ 371 (c)(1),
(2) Date: Mar. 16, 2015

(87) PCT Pub. No.: WO2015/010556
PCT Pub. Date: Jan. 29, 2015

(65) Prior Publication Data
US 2016/0127680 A1    May 5, 2016

(30) Foreign Application Priority Data

Jul. 22, 2013  (CN) .......................... 2013 1 0309539

(51) Int. Cl.
H04N 7/15        (2006.01)
H04N 7/14        (2006.01)
H04L 29/06       (2006.01)

(52) U.S. Cl.
CPC .......... *H04N 7/141* (2013.01); *H04L 65/1026* (2013.01); *H04L 65/1069* (2013.01); *H04L 65/80* (2013.01)

(58) Field of Classification Search
None
See application file for complete search history.

(56) References Cited

U.S. PATENT DOCUMENTS

2012/0163298 A1* 6/2012 Zhou ..................... H04W 40/02
                                                    370/328
2013/0246642 A1* 9/2013 Chen ................... H04L 12/1818
                                                    709/228

* cited by examiner

*Primary Examiner* — Creighton Smith
(74) *Attorney, Agent, or Firm* — Anova Law Group, PLLC

(57) ABSTRACT

Methods and systems for controlling an audio and video transmission channel for use in a server is provided. The method includes obtaining an audio and video transmission connection request, and obtaining transmission channel information reported from respective terminals to establish an audio and video transmission connection; determining a transmission channel type of the audio and video transmission connection, according to the reported transmission channel information; and issuing to the terminals the determined transmission channel type of the audio and video transmission connection.

12 Claims, 9 Drawing Sheets ness: Inc. 9,516,264 B2

METHODS, DEVICES, AND SYSTEMS FOR CONTROLLING AUDIO AND VIDEO TRANSMISSION CHANNEL

CROSS REFERENCE TO RELATED APPLICATIONS

This international application claims priority to Chinese Patent Application No. 201310309539.0, filed Jul. 22, 2013, the entire contents of which are incorporated herein by reference.

TECHNICAL FIELD

This disclosure generally relates to the audio and video transmission technology and, more particularly, to methods, devices, and systems for controlling an audio and video transmission channel.

BACKGROUND

With the development of network technology, online meetings can be realized through the application of video software and one party can play video for another party, which brings great convenience to the users. Conventionally, when a user A and a user B want to start a video chat, user A can send a video invitation to user B, who can accept the video chat after receiving the video invitation. Meanwhile, a server can send commands to establish a video connection between client terminals of user A and user B. The client terminals of user A and user B first attempt to establish a direct channel connection. If the quality of the direct channel connection is poor, the client terminal can request to use a relay channel connection. The request for the relay channel connection is sent for the server to determine whether to accept. In this system, for example, even after user B determines to use the relay channel, user A and the user B must still wait for the server's determination before they can be connected and an audio and video image can be displayed. There may be a large time delay, which affects the audio and video transmission effect.

SUMMARY

According to a first aspect of the present disclosure, there is provided a method for controlling an audio and video transmission channel for use in a server, comprising: obtaining an audio and video transmission connection request, and obtaining transmission channel information reported from respective terminals to establish an audio and video transmission connection; determining a transmission channel type of the audio and video transmission connection, according to the reported transmission channel information; and issuing to the terminals the determined transmission channel type of the audio and video transmission connection.

According to a second aspect of the present disclosure, there is provided a server, comprising: a processor; and a memory for storing instructions executable by the processor; wherein the processor is configured to: obtain an audio and video transmission connection request, and obtain transmission channel information reported from respective terminals to establish an audio and video transmission connection; determine a transmission channel type of the audio and video transmission connection, according to the reported transmission channel information; and issue to the terminals the determined transmission channel type of the audio and video transmission connection.

According to a third aspect of the present disclosure, there is provided a system for controlling an audio and video transmission channel, comprising: an audio and video server; a relay server; and at least two terminals; wherein a first one of the at least two terminals sends a request for an audio and video transmission connection to remaining ones of the at least two terminals, and the at least two terminals report their respective transmission channel information to the audio and video server via the relay server; and wherein the audio and video server is configured to obtain the request for the audio and video transmission connection and the reported transmission channel information, determine a transmission channel type of the audio and video transmission connection according to the reported transmission channel information, and issue the determined transmission channel type to the at least two terminals via the relay server.

It is to be understood that both the foregoing general description and the following detailed description are exemplary and explanatory only and are not restrictive of the inventions, as claimed.

DESCRIPTION OF DRAWINGS

The accompanying drawings, which are incorporated in and constitute a part of this specification, illustrate embodiments consistent with the inventions herein and, together with the description, serve to explain the principles of the inventions.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the inventions. Instead, they are merely examples of apparatuses and methods consistent with aspects related to the inventions as recited in the appended claims.

Figure 1:
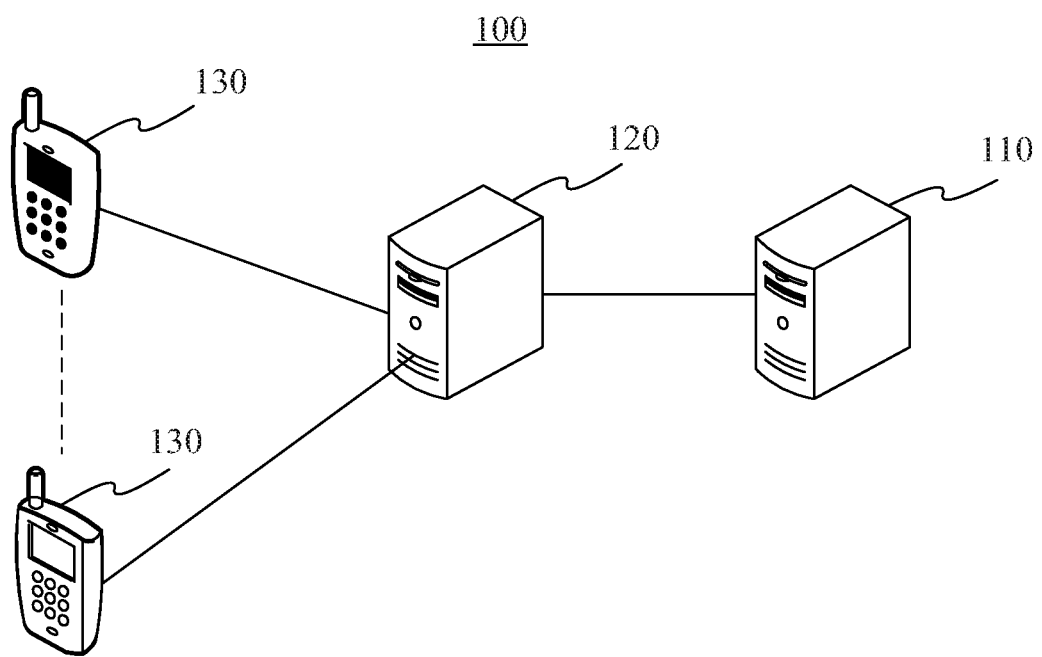
FIG. 1 is a block of a system for controlling an audio and video transmission channel, according to an exemplary embodiment.

FIG. 1 is a block diagram of a system 100 for controlling an audio and video transmission channel, according to an exemplary embodiment. Referring to FIG. 1, the system 100 comprises an audio and video server 110, a relay server 120, and at least two terminals 130.

In exemplary embodiments, a first terminal of the at least two terminals 130 sends a request for establishing an audio and video transmission connection to at least one remaining terminal of the terminals 130. In addition, the at least two terminals 130 report their respective transmission channel information to the audio and video server 110 via the relay server 120.

In one exemplary embodiment, an audio and video transmission connection is to be established between the first terminal and a second terminal of the at least two terminals 130. For example, the first terminal sends a request for establishing an audio and video transmission connection to the second terminal, and the first terminal and the second terminal report their respective transmission channel information to the audio and video server 110, via the relay server 120. The transmission channel information comprises a channel address (including an IP address and a port address), a transmission time period, a packet loss rate, a time delay, a bit rate and so on. The time delay refers to a total elapsed time of a data packet from a start of sending to a reception by the opposite side. A high network packet loss rate or a long time delay indicates a poor network status. As a result, quality of the audio and video transmission is affected. The code rate refers to a number of data bits transmitted per unit of time, e.g., 1 kilobits per second (kbps). In addition, the transmission channel information further comprises a geographic location of the terminal and an operator type. The network status may also be affected due to different geographic locations of the terminal or different operator types.

In exemplary embodiments, the audio and video server 110 is configured to obtain the request for the audio and video transmission connection and the reported transmission channel information, and determine a transmission channel type of the audio and video transmission connection according to the reported transmission channel information. The audio and video server 110 is further configured to issue the determined transmission channel type to the at least two terminals 130 via the relay server 120.

In exemplary embodiments, the audio and video transmission connection request comprises a video playback connection request, a screen sharing connection request, etc. The video playback connection request refers to a request for playing a local video file to an opposite party during the audio and video transmission process. The screen sharing connection request refers to a request for playing a current user screen to the opposite party during the audio and video transmission process.

The transmission channel type can be a relay channel or a direct channel. The relay channel refers to the channel through which at least two terminals transmit audio and video data via the replay server 120. The direct channel refers to the channel through which at least two terminals directly transmit audio and video data. The audio and video server 110 determines the transmission channel type of the audio and video transmission connection, according to the reported information transmission channel. The process can include performing a priority selection of the direct channel, and determining whether an effect of the direct channel is poor, according to this transmission channel information. If so, the audio and video server 110 switches to the relay channel, and further determines whether an effect of the relay channel is poor. If not, the relay channel continues to be used. If the effect of the direct channel is good, the direct channel continues to be used.

In exemplary embodiments, a criteria for determining the effect of the direct channel includes determining at least one of whether the packet loss rate in transmission channel information is greater than a packet loss threshold value, whether the time delay is greater than a time delay threshold value, or whether the code rate is lower than a code rate threshold value. When at least one of the three conditions is met, it is determined that the effect of the direct channel is poor. Similarly, the criteria can also be used to determine the effect of the relay channel.

When the audio and video transmission connection request is sent in the system 100, the audio and video server 110 determines the transmission channel type of the audio and video transmission connection, according to the reported transmission channel information. Due to the fact that the transmission channel type can be determined by the transmission channel information, and the audio and video transmission connection is established according to the transmission channel type, a delay time of displaying the audio and video screen after the connection of the audio and video transmission is reduced, and the effect of the audio and video transmission is improved.

In one exemplary embodiment, the at least two terminals 130 also periodically report the transmission channel type and their respective current transmission channel information. The current transmission channel information comprises a channel address (including an IP address and a port address), a transmission time period, a packet loss rate, a time delay, a bit rate, a terminal location, and an operator type.

The audio and video server 110 is also configured to periodically receive the reported transmission channel type and the current transmission channel information, and determine whether a change has taken place in the transmission channel information according to the current transmission channel information and historical transmission channel information. If so, the audio and video server 110 determines a new transmission channel type according to the current transmission channel information, and issues, via the relay server 120, the new transmission channel type to the at least two terminals 130.

For example, transmission channel information includes current transmission channel information and historical transmission channel information. The historical transmission channel information comprises a channel address (including an IP address and a port address), a transmission time quantum, a packet loss rate, a time delay, a bit rate and so on.

The audio and video server 110 compares the current transmission channel information with the historical transmission channel information, and determines whether the packet loss rate, the time delay, and the code rate have changed.

The audio and video server 110 can dynamically control the transmission channel according to the periodically reported current transmission channel information, and the control is flexible. The transmission channel type after the control can be more suitable for the actual status of the current audio and video transmission network connection.

In one exemplary embodiment, the audio and video server 110 is also configured to calculate statistics of a total number of relay channels used in the terminal 130, and determine whether the total number exceeds a load threshold value. If so, the audio and video server 110 screens out a predetermined number of relay channels from the total number of relay channels, and converts the screened-out channels into direct channels.

For example, the audio and video server 110 can evaluate the quality of the in-use relay channel, obtain a quality evaluation value corresponding to each relay channel, and ranks the relay channels according to the evaluation values from small to large. The audio and video server 110 can further select the predetermined number of relay channels from the ranked relay channels, and convert to direct channels. The predetermined number can be set according to actual needs, e.g., 10, 20, etc.

In addition, the audio and video server 110 is also configured to preset a channel conversion threshold value for converting relay channels into to direct channels, and acquire the transmission channel information of a relay channel in use. The audio and video server 110 is further configured to acquire a parameter value from the transmission channel information, and determine whether this parameter value is greater than the channel conversion threshold value. If so, the audio and video server 110 converts the relay channel into the direct channel. The audio and video server 110 is also configured to adjust down this channel conversion threshold value, in case the total number of relay channels used in the terminal 130 has exceeded the load threshold value. The above-noted parameter value can be the packet loss rate. For example, if an initial threshold value of the packet loss rate is 8%, it is possible to reduce the threshold value of the packet loss rate to 7% during a network peak period.

By converting some relay channels into direct channels, it can reduce the work load of the audio and video server 110.

Figure 2:
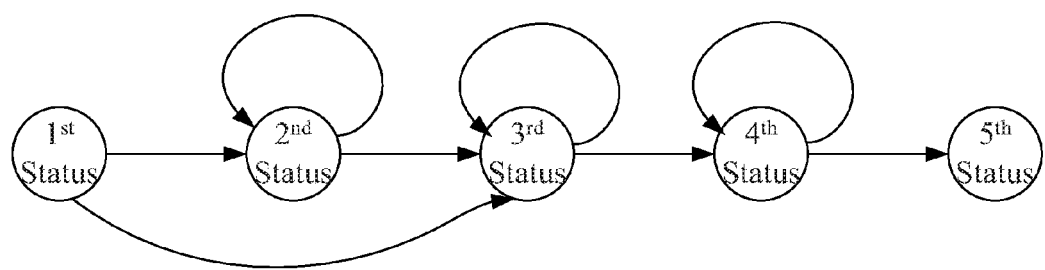
FIG. 2 is a diagram for a switching logic, according to an exemplary embodiment.

In one exemplary embodiment, the audio and video server 110 can also adjust a switching logic between direct channels and repay channels, according to the transmission channel information. The switching logic comprises five statuses, as shown in FIG. 2. The first status is an initial status, the second status is a status of using a relay channel after an initial connection with a direct channel fails. During this period, it is determined whether the terminal's direct channel information is received and the direct channel is established, and it keeps using the relay channel. The third status is a status to use the direct channel. The fourth status is a status to use the direct channel. The fifth status is the finish status to keep using the direct channel. The conditions and implications of the various statuses are listed as follows.

(1) Switch from the first status into the third status: a direct channel for an audio and video transmission connection is established.

(2) Switch from the first status into the second status: a direct channel for an audio and video transmission connection cannot be established. In this case, a relay channel is first established, and it is further detected whether the direct channel can be used every first predetermined time. The first predetermined time can be determined according to actual needs. In this embodiment, the first predetermined time is 5 seconds.

(3) Switch from the second status into the second status: when in the second status, it is detected whether the direct channel still can't be used every first predetermined time. If so, maintain in the second status.

(4) Switch from the second status into the third status: when in the second status, it is detected whether the direct channel can be used every first predetermined time. If so, use the direct channel and enter into the third status.

(5) Switch from the third status into the third status: when in the third status, it is detected every second predetermined time whether the code rate during a continuous first predetermined quantity of a first period is less than a second code rate threshold value. If not, it indicates that the effects of the direct channel are good and, in this case, the use of the direct channel is maintained, that is, remaining in the third status. The second predetermined time and the first predetermined quantity can be set according to actual needs. In this embodiment, the second predetermined time is 18 s the first predetermined quantity is 5, the first period is 18 s and the second code rate threshold value is 100. That is, the code rate within 15 consecutive 18 seconds is less than or equal to 100.

(6) Switch from the third status into the fourth status: when in the fourth status, it is detected every third predetermined time whether the code rate during the continuous first predetermined quantity of the first period is less than the second code rate threshold value. In this case, the effects of the direct channel are poor, and switches into the direct channel.

(7) Switch from the fourth status into the fourth status: when in the fourth status, it is detected every third predetermined time whether the code rate during a continuous second predetermined quantity of a second period is less than or equal to the second code rate threshold value. If not, it indicates that the effects of the direct channel are good and, in this case, the use of the relay channel is maintained. The third predetermined time and the second predetermined quantity can be determined according to actual needs. In this embodiment, the third predetermined time is 30 s, the second predetermined quantity is 10, and the second period is 30 s.

(8) Switch from the fourth status into the fifth status: when in the fourth status, it is detected every third predetermined time whether the code rate within the continuous second predetermined quantity of the second period is less than or equal to the second code rate threshold value. If so, it indicates that the effects of the relay channel are poor, and it is switched into use of the direct channel. After entering into the fifth status, the use of the direct channel is maintained, without use of the relay channel.

Furthermore, the first predetermined time, the second predetermined time, the third predetermined time, the first predetermined quantity, the second predetermined quantity, and the second code rate threshold value can adjusted. As a result, the switching logic between the relay channel and the direct channel can be adjusted, and the direct channel and the relay channel can be flexibly used.

Figure 3:
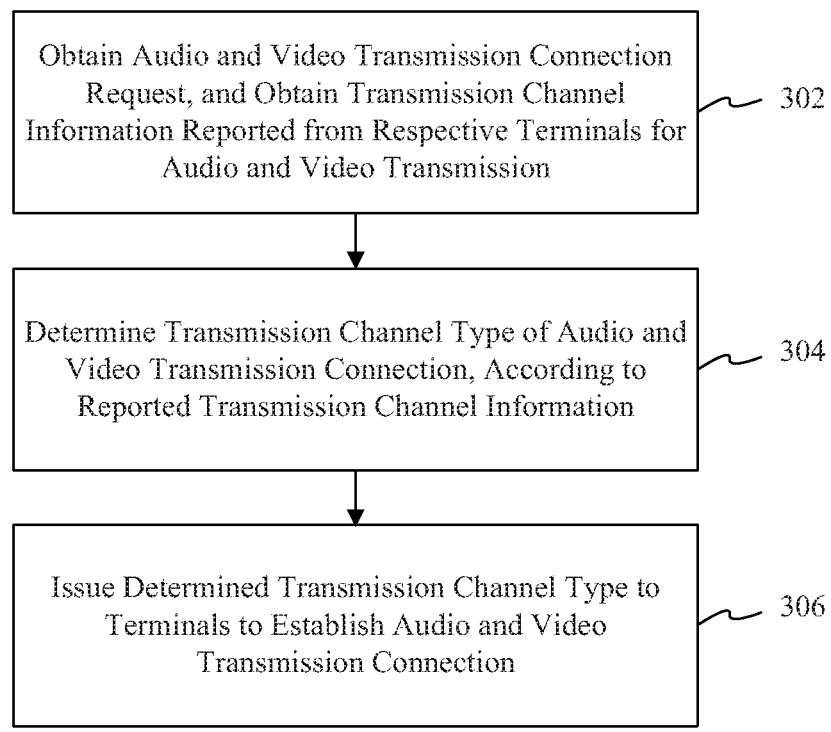
FIG. 3 is a flowchart of a method for controlling an audio and video transmission channel, according to an exemplary embodiment.

FIG. 3 is a flowchart of a method 300 for controlling an audio and video transmission channel, according to an exemplary embodiment. The method 300 can be implemented with an audio and video server, such as the audio and video server 110 (FIG. 1). Referring to FIG. 3, the method 300 includes the following steps.

In step 302, the audio and video server obtains an audio and video transmission connection request, and obtains transmission channel information reported from respective terminals for the audio and video transmission.

In one exemplary embodiment, an audio and video transmission connection is to be established between a first terminal and a second terminal. For example, the first terminal sends a request for establishing an audio and video transmission connection to the second terminal, and the first terminal and the second terminal report their respective transmission channel information to the audio and video server, via the relay server. The transmission channel information comprises a channel address (including an IP address and a port address), a transmission time period, a packet loss rate, a time delay, a bit rate and so on. The time delay refers to a total elapsed time of a data packet from a start of sending to a reception by the opposite side. A high network packet loss rate or a long time delay indicates a poor network status. As a result, quality of the audio and video transmission is affected. The code rate refers to a number of data bits transmitted per unit of time, e.g., 1 kilobits per second (kbps). In addition, the transmission channel information further comprises a geographic location of the terminal and an operator type. The network status may also be affected due to different geographic locations of the terminal or different operator types.

In exemplary embodiments, the audio and video transmission connection request comprises a video playback connection request, a screen sharing connection request, etc. The video playback connection request refers to a request for playing a local video file to an opposite party during the audio and video transmission process. The screen sharing connection request refers to a request for playing a current user screen to the opposite party during the audio and video transmission process.

In step 304, the audio and video server determines a transmission channel type of the audio and video transmission connection, according to the reported transmission channel information.

The transmission channel type can be a relay channel or a direct channel. The relay channel refers to the channel through which at least two terminals transmit audio and video data via the replay server. The direct channel refers to the channel through which at least two terminals directly transmit audio and video data. The audio and video server determines the transmission channel type of the audio and video transmission connection, according to the reported information transmission channel. The process can include performing a priority selection of the direct channel, and determining whether an effect of the direct channel is poor, according to this transmission channel information. If so, the audio and video server 110 switches to the relay channel, and further determines whether an effect of the relay channel is poor. If not, the relay channel continues to be used. If the effect of the direct channel is good, the direct channel continues to be used.

In exemplary embodiments, a criteria for determining the effect of the direct channel includes determining at least one of whether the packet loss rate in transmission channel information is greater than a packet loss threshold value, whether the time delay is greater than a time delay threshold value, or whether the code rate is lower than a code rate threshold value. When at least one of the three conditions is met, it is determined that the effect of the direct channel is poor. Similarly, the criteria can also be used to determine the effect of the relay channel.

In step 306, the audio and video server issues the determined transmission channel type to the terminals to establish the audio and video transmission connection.

When the audio and video transmission connection request is sent, the audio and video server determines the transmission channel type of the audio and video transmission connection, according to the reported transmission channel information. Due to the fact that the transmission channel type can be determined by the transmission channel information, and the audio and video transmission connection is established according to the transmission channel type, a delay time of displaying the audio and video screen after the connection of the audio and video transmission is reduced, and the effect of the audio and video transmission is improved.

Figure 4:
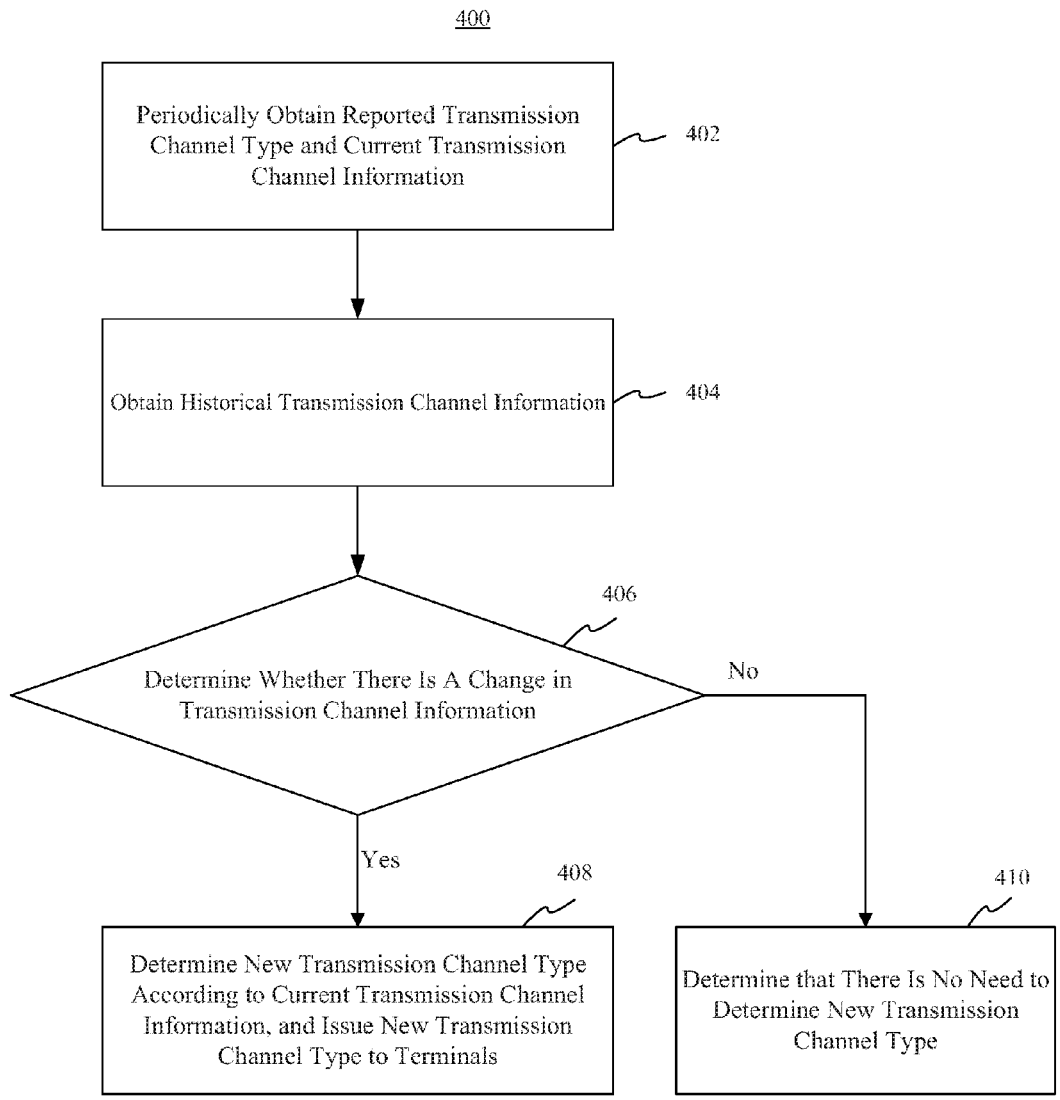
FIG. 4 is a flowchart of a method for controlling an audio and video transmission channel, according to an exemplary embodiment.

FIG. 4 is a flowchart of a method 400 for controlling an audio and video transmission channel, according to an exemplary embodiment. The method 400 is used after the determined transmission channel type is sent to the terminals to establish the audio and video transmission connection.

In step 402, the audio and video server periodically obtains a reported transmission channel type and current transmission channel information. The current transmission channel information comprises a channel address (including an IP address and a port address), a transmission time period, a packet loss rate, a time delay, a bit rate, a terminal location, and an operator type.

In step 404, the audio and video server obtains historical transmission channel information. The historical transmission channel information comprises a channel address (including an IP address and a port address), a transmission time period, a packet loss rate, a time delay, a bit rate, and so on.

In step 406, the audio and video server determines whether there is a change in the transmission channel information, according to the current transmission channel information and the historical transmission channel information. If so, step 408 is performed, otherwise, step 410 is performed.

For example, the audio and video server compares the current transmission channel information with the historical transmission channel information, and determines whether the packet loss rate, the time delay, and the code rate in the transmission channel information have changed.

In step 408, the audio and video server determines a new transmission channel type according to the current transmission channel information, and issues the new transmission channel type to the terminals to establish the audio and video transmission connection.

In step 410, it is determined that there is no need to determine a new transmission channel type.

In the above embodiment, the transmission channel is dynamically controlled according to the periodically reported current transmission channel information. As a result, the control is flexible, and the transmission channel type after the control can be more suitable for the actual status of the current audio and video transmission network connection.

In one exemplary embodiment, after the determined transmission channel type is sent to the terminals to establish the audio and video transmission connection, the audio and video server also calculates statistics of a total number of relay channels used in the terminal, and determine whether the total number exceeds a load threshold value. If so, the audio and video server screens out a predetermined number of relay channels from the total number of relay channels, and converts the screened-out channels into direct channels.

For example, the audio and video server can evaluate the quality of the in-use relay channel, obtain a quality evaluation value corresponding to each relay channel, and ranks the relay channels according to the evaluation values from small to large. The audio and video server can further select the predetermined number of relay channels from the ranked relay channels, and convert to direct channels. The predetermined number can be set according to actual needs, e.g., 10, 20, etc.

In addition, the audio and video server is also configured to preset a channel conversion threshold value for converting relay channels into direct channels, and acquire the transmission channel information of a relay channel in use The audio and video server is further configured to acquire a parameter value from the transmission channel information, and determine whether this parameter value is greater than the channel conversion threshold value. If so, the audio and video server converts the relay channel into the direct channel. The audio and video server 110 is also configured to adjust down this channel conversion threshold value, in case the total number of relay channels used in the terminal has exceeded the load threshold value. The above noted parameter value can be the packet loss rate. If an initial threshold value of the packet loss rate is 8%, it is possible to reduce the threshold value of the packet loss rate to 7% during a network peak period.

By converting some relay channels into direct channels, it can reduce the work load of the audio and video server.

In one exemplary embodiment, the method 400 also comprises adjusting a switching logic between the direct channel and the relay channel, according to the transmission channel information. The switching logic comprises five statuses, as shown in FIG. 2. The first status is an initial status, the second status is a status of using a relay channel after an initial connection with a direct channel fails. During this period, it is determined whether the terminal's direct channel information is received and the direct channel is established, and it keeps using the relay channel. The third status is a status to use the direct channel. The fourth status is a status to use the direct channel. The fifth status is the finish status to keep using the direct channel. Furthermore, the first predetermined time, the second predetermined time, the third predetermined time, the first predetermined quantity, the second predetermined quantity, and the second code rate threshold value in the five statues can adjusted. As a result, the switching logic between the relay channel and the direct channel can be adjusted, and the direct channel and the relay channel can be flexibly used.

Figure 5:
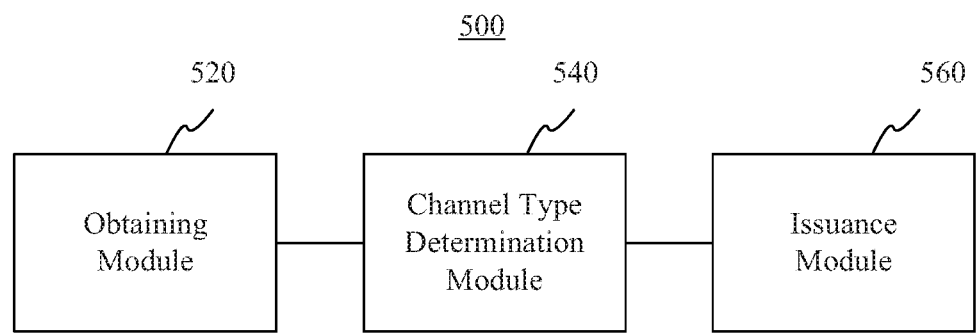
FIG. 5 is a block diagram of a device for controlling an audio and video transmission channel, according to an exemplary embodiment.

FIG. 5 is a block diagram of a device 500 for controlling an audio and video transmission channel, according to an exemplary embodiment. For example, the device 500 can be used in an audio and video server. Referring to FIG. 5, the device 500 includes an obtaining module 520, a channel type determination module 540, and an issuance module 560.

The obtaining module 520 is configured to obtain a request for establishing an audio and audio transmission connection, and transmission channel information reported from respective terminals to establish the audio and video transmission connection.

In one exemplary embodiment, an audio and video transmission connection is to be established between a first terminal and a second terminal. For example, the first terminal sends a request for establishing an audio and video transmission connection to the second terminal, and the first terminal and the second terminal report their respective transmission channel information to the audio and video server, via the relay server. Accordingly, the obtaining module 520 obtains the reported transmission channel information. The transmission channel information comprises a channel address (including an IP address and a port address), a transmission time period, a packet loss rate, a time delay, a bit rate and so on. The time delay refers to a total elapsed time of a data packet from a start of sending to a reception by the opposite side. A high network packet loss rate or a long time delay indicates a poor network status. As a result, quality of the audio and video transmission is affected. The code rate refers to a number of data bits transmitted per unit of time, e.g., 1 kilobits per second (kbps). In addition, the transmission channel information further comprises a geographic location of the terminal and an operator type. The network status may also be affected due to different geographic locations of the terminal or different operator types.

In exemplary embodiments, the audio and video transmission connection request comprises a video playback connection request, a screen sharing connection request, etc. The video playback connection request refers to a request for playing a local video file to an opposite party during the audio and video transmission process. The screen sharing connection request refers to a request for playing a current user screen to the opposite party during the audio and video transmission process.

The channel type determination module 540 is configured to determine a transmission channel type of the audio and video transmission connection, according to the reported transmission channel information;

The transmission channel type can be a relay channel or a direct channel. The relay channel refers to the channel through which at least two terminals transmit audio and video data via the replay server. The direct channel refers to the channel through which at least two terminals directly transmit audio and video data. The channel type determination module 540 determines the transmission channel type of the audio and video transmission connection, according to the reported information transmission channel. The process can include performing a priority selection of the direct channel, and determining whether an effect of the direct channel is poor, according to this transmission channel information. If so, the channel type determination module 540 switches to the relay channel, and further determines whether an effect of the relay channel is poor. If not, the relay channel continues to be used. If the effect of the direct channel is good, the direct channel continues to be used.

In exemplary embodiments, a criteria for determining the effect of the direct channel includes determining at least one of whether the packet loss rate in transmission channel information is greater than a packet loss threshold value, whether the time delay is greater than a time delay threshold value, or whether the code rate is lower than a code rate threshold value. When at least one of the three conditions is met, it is determined that the effect of the direct channel is poor. Similarly, the criteria can also be used to determine the effect of the relay channel.

The issuance module 560 is configured to issue the determined transmission channel type to the terminals to establish the audio and video transmission connection.

When the audio and video transmission connection request is sent to the device 500, the device 500 determines the transmission channel type of the audio and video transmission connection, according to the reported transmission channel information. Due to the fact that the transmission channel type can be determined by the transmission channel information, and the audio and video transmission connection is established according to the transmission channel type, a delay time of displaying the audio and video screen after the connection of the audio and video transmission is reduced, and the effect of the audio and video transmission is improved.

Figure 6:
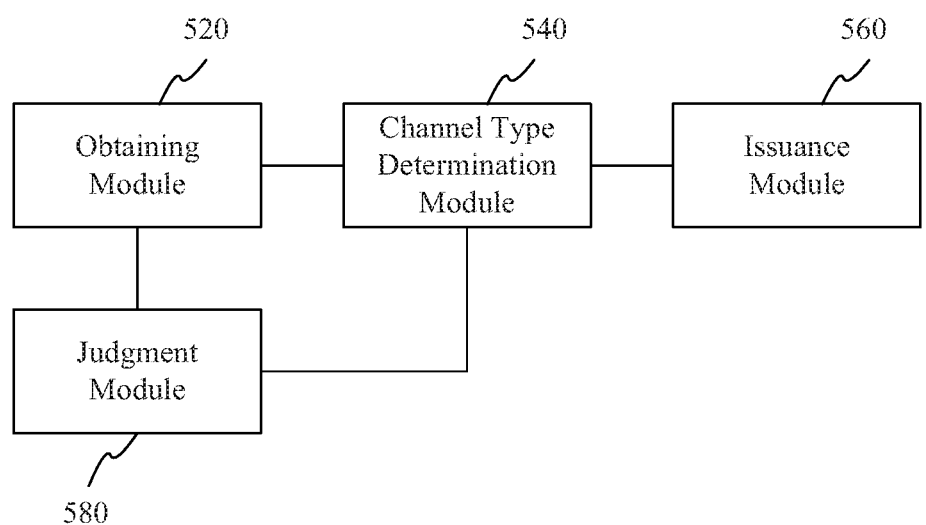
FIG. 6 is a block diagram of a device for controlling an audio and video transmission channel, according to an exemplary embodiment.

FIG. 6 is a block diagram of a device 600 for controlling an audio and video transmission channel, according to an exemplary embodiment. For example, the device 600 may be used in an audio and video server. Referring to FIG. 6, the device 600 includes a judgment module 580, in addition to the obtaining module 520, the channel type determination module 540, and the issuance module 560 (FIG. 5).

The obtaining module 520 is also configured to periodically obtain a reported transmission channel type, current transmission channel information, and historical information transmission channel. The current transmission channel information and the historical transmission channel information each comprise a channel address (including an IP address and a port address), a transmission time period, a packet loss rate, a time delay, a bit rate, a geographic location of the terminal, and an operator type.

The judgment module 580 is configured to judge whether a change has taken place in the transmission channel information, according to the current transmission channel information and the historical transmission channel information. For example, the judgment module 580 compares the current transmission channel information with the historical transmission channel information, and judges whether the packet loss rate, the time delay, and/or the code rate have changed.

In the illustrated embodiment, the transmission channel is dynamically controlled according to the periodically reported current transmission channel information. As a result, the control is flexible, and the transmission channel type after the control can be more suitable for the actual status of the current audio and video transmission connection.

Figure 7:
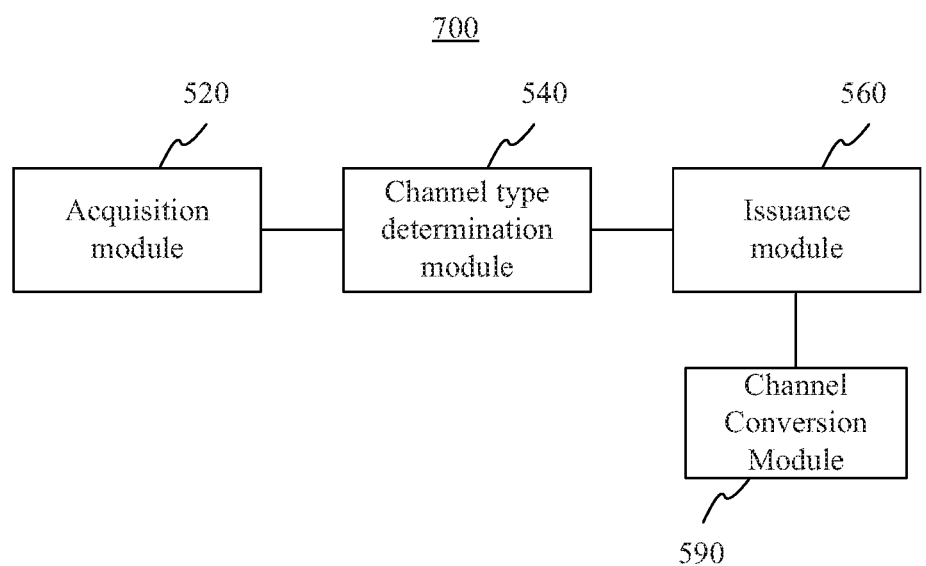
FIG. 7 is a block diagram of a device for controlling an audio and video transmission channel, according to an exemplary embodiment.

FIG. 7 is a block diagram of a device 700 for controlling an audio and video transmission channel, according to an exemplary embodiment. For example, the device 700 may be used in an audio and video server. Referring to FIG. 7, the device 700 includes a channel conversion module 590, in addition to the acquisition module 520, the channel type determination module 540, and the issuance module 560 (FIG. 5).

The channel conversion module 590 is configured to calculate statistics of a total number of replay channels used by the terminal, and judge whether the total number has exceeded a load threshold value. The channel conversion module 590 is also configured to screen out a predetermined number of relay channels from the total number of relay channels, and convert the screened-out channels into direct channels.

For example, the channel conversion module 590 can evaluate the quality of the in-use relay channel, obtain a quality evaluation value corresponding to each relay channel, and ranks the relay channels according to the evaluation values from small to large. The channel conversion module 590 can further select the predetermined number of relay channels from the ranked relay channels, and convert to direct channels. The predetermined number can be set according to actual needs, e.g., 10, 20, etc.

Figure 8:
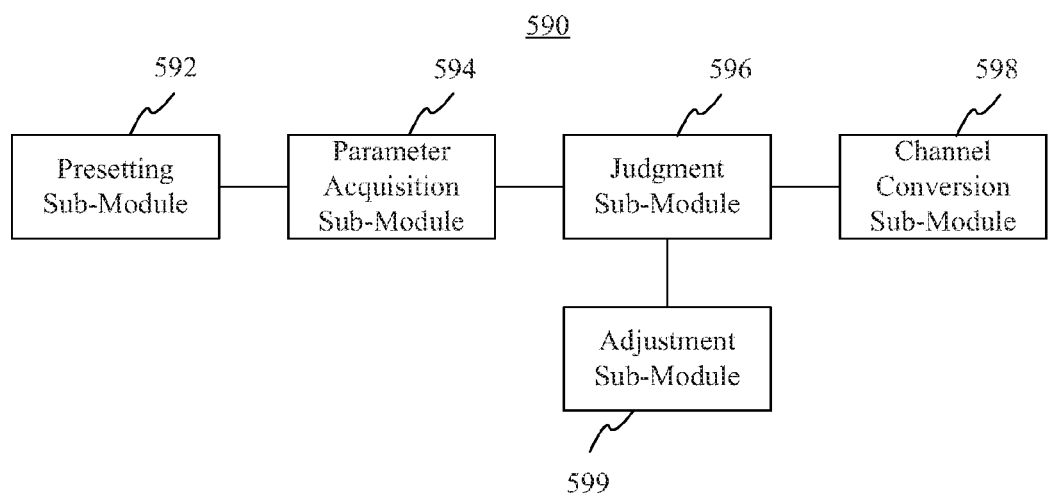
FIG. 8 is a block diagram of a channel conversion module, according to an exemplary embodiment.

FIG. 8 is a block diagram of the channel conversion module 590 (FIG. 7), according to an exemplary embodiment. Referring to FIG. 8, the channel conversion module 590 comprises a presetting sub-module 592, a parameter acquisition sub-module 594, a judgment sub-module 596, a channel conversion sub-module 598, and an adjustment sub-module 599.

The presetting sub-module 592 is configured to preset a channel conversion threshold value for converting relay channels to direct channels. The parameter acquisition sub-module 594 is configured to acquire the transmission channel information of the relay channel in use, and acquire a parameter value from this transmission channel information. The judgment sub-module 596 is configured to judge whether this parameter value is greater than the channel conversion threshold value. The channel conversion sub-module 598 is configured to convert the relay channel into the direct channel. The adjustment sub-module 599 is configured to adjust down the channel conversion threshold value, in case the total number of relay channels used in terminals has exceeded the load threshold value.

The above noted parameter value can be the packet loss rate. For example, if an initial threshold value of the packet loss rate is 8%, it is possible to reduce the threshold value of the packet loss rate to 7% during a network peak period.

By converting some relay channels into direct channels, it can reduce the work load of the audio and video server.

In one exemplary embodiment, the device 700 (FIG. 7) also comprises an adjustment module configured to adjust a switching logic between the direct channel and the relay channel, according to the transmission channel information. The switching logic comprises five statuses, as shown in FIG. 2. The first status is an initial status, the second status is a status of using a relay channel after an initial connection with a direct channel fails. During this period, it is determined whether the terminal's direct channel information is received and the direct channel is established, and it keeps using the relay channel. The third status is a status to use the direct channel. The fourth status is a status to use the direct channel. The fifth status is the finish status to keep using the direct channel.

Figure 9:
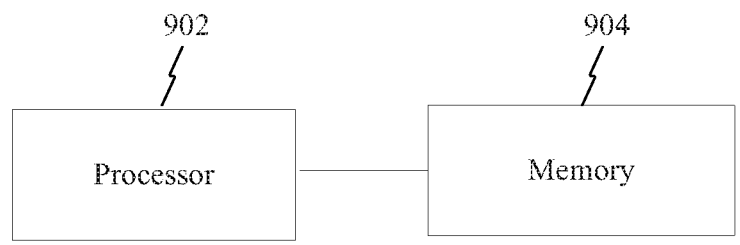
FIG. 9 is a block diagram of a device for controlling an audio and video transmission channel, according to an exemplary embodiment.

FIG. 9 is a block diagram of a device 900 for controlling an audio and video transmission channel, according to an exemplary embodiment. For example, the device 900 can be an audio and video server. Referring to FIG. 9, the device 900 includes a processor 902 and a memory 904 for storing data as well as for storing instructions for perform the above described methods for controlling an audio and video transmission channel, and otherwise facilitating operation of the processor 902.

In exemplary embodiments, there is also provided a non-transitory computer-readable storage medium including instructions, such as included in the memory 904, executable by the processor 902, for performing the above-described methods for controlling an audio and video transmission channel. For example, the storage medium can be a disk, a CD-ROM, a read-only memory, or a random access memory and so on.

One of ordinary skill in the art will understand that the above described modules/sub-modules can each be implemented by hardware, or software, a combination of hardware and software. One of ordinary skill in the art will also understand that multiple ones of the above described modules may be combined as one module, and each of the above described modules may be further divided into a plurality of sub-modules.

Other embodiments of the inventions will be apparent to those skilled in the art from consideration of the specification and practice of the inventions disclosed here. This application is intended to cover any variations, uses, or adaptations of the inventions following the general principles thereof and including such departures from the present disclosure as come within known or customary practice in the art. It is intended that the specification and examples be considered as exemplary only, with a true scope and spirit of the inventions being indicated by the following claims.

It will be appreciated that the present inventions are not limited to the exact construction that has been described above and illustrated in the accompanying drawings, and that various modifications and changes can be made without departing from the scope thereof. It is intended that the scope of the inventions only be limited by the appended claims.

The invention claimed is:

1. A method for controlling an audio and video transmission channel for use in a server, comprising:
   obtaining an audio and video transmission connection request, and obtaining transmission channel information reported from respective terminals to establish an audio and video transmission connection;

determining a transmission channel type of the audio and video transmission connection, according to the reported transmission channel information; and issuing to the terminals the determined transmission channel type of the audio and video transmission connection;

wherein the transmission channel type is one of a direct channel and a relay channel, after the determining of the transmission channel type, the method further comprising:

calculating statistics of a total number of relay channels used by the terminals, and determining whether the total number exceeds a load threshold value; and if it is determined that the total number exceeds the load threshold value, screen out a predetermined number of relay channels from the total number of relay channels, and converting the screened-out channels into direct channels.

2. The method of claim 1, further comprising:

periodically obtaining a reported transmission channel type and current transmission channel information;

obtaining historical transmission channel information;

determining whether there is a change in the transmission channel information, according to the current transmission channel information and the historical transmission channel information; and if it is determined that there is a change, determining a new transmission channel type according to the current transmission channel information, and issuing the new transmission channel type to the terminals to establish the audio and video transmission connection.

3. The method of claim 1, further comprising:

presetting a channel conversion threshold value for converting relay channels to direct channels;

obtaining the transmission channel information of a relay channel in use, and obtaining a parameter value from the obtained transmission channel information;

determining whether the parameter value is greater than the channel conversion threshold value; and if it is determined that the parameter value is greater than the channel conversion threshold value, converting the relay channel into a direct channel.

4. The method of claim 3, further comprising:

if it is determined that the total number of relay channels used by the terminals exceeds the load threshold value, adjusting down the channel conversion threshold value.

5. A server, comprising:

a processor; and a memory for storing instructions executable by the processor;

wherein the processor is configured to:

obtain an audio and video transmission connection request, and obtain transmission channel information reported from respective terminals to establish an audio and video transmission connection;

determine a transmission channel type of the audio and video transmission connection, according to the reported transmission channel information; and issue to the terminals the determined transmission channel type of the audio and video transmission connection;

wherein the transmission channel type is one of a direct channel and a relay channel, the processor being further configured to:

calculate statistics of a total number of relay channels used by the terminals, and determine whether the total number exceeds a load threshold value; and if it is determined that the total number exceeds the load threshold value, screen out a predetermined number of relay channels from the total number of relay channels, and convert the screened-out channels into direct channels.

6. The server of claim 5, wherein the processor is further configured to:

periodically obtain a reported transmission channel type and current transmission channel information;

obtain historical transmission channel information;

determine whether there is a change in the transmission channel information, according to the current transmission channel information and the historical transmission channel information; and if it is determined that there is a change, determine a new transmission channel type according to the current transmission channel information, and issue the new transmission channel type to the terminals to establish the audio and video transmission connection.

7. The server of claim 5, wherein the processor is further configured to:

preset a channel conversion threshold value for converting relay channels to direct channels;

obtain the transmission channel information of a relay channel in use, and obtain a parameter value from the obtained transmission channel information;

determine whether the parameter value is greater than the channel conversion threshold value; and if it is determined that the parameter value is greater than the channel conversion threshold value, convert the relay channel into a direct channel.

8. The server of claim 5, wherein the processor is further configured to:

if it is determined that the total number of relay channels used by the terminals exceeds the load threshold value, adjust down the channel conversion threshold value.

9. A system for controlling an audio and video transmission channel, comprising:

an audio and video server;

a relay server; and at least two terminals;

wherein a first one of the at least two terminals sends a request for an audio and video transmission connection to remaining ones of the at least two terminals, and the at least two terminals report their respective transmission channel information to the audio and video server via the relay server;

wherein the audio and video server is configured to obtain the request for the audio and video transmission connection and the reported transmission channel information, determine a transmission channel type of the audio and video transmission connection according to the reported transmission channel information, and issue the determined transmission channel type to the at least two terminals via the relay server; and wherein the transmission channel type is one of a direct channel and a relay channel, and the audio and video server is configured to:

calculate statistics of a total number of relay channels used by the terminals;

determine whether the total number exceeds a load threshold value; and if it is determined that the total number exceeds the load threshold value, screen out a predetermined number of relay channels from the total number of relay channels, and convert the screened-out channels into direct channels.

10. The system of claim 9, wherein:
the at least two terminals are configured to periodically report a transmission channel type, and their respective current transmission channel information;
the audio and video server is configured to periodically obtain the reported transmission channel type and the reported current transmission channel information, obtain historical transmission channel information, and determine whether there is a change in the transmission channel information according to the current transmission channel information and the historical transmission channel information; and
if it is determined that there is a change, the audio and video server is further configured to determine a new transmission channel type according to the current transmission channel information, and send the new transmission channel type to the at least two terminals via the relay server.

11. The system of claim 9, wherein the audio and video server is configured to:
preset a channel conversion threshold value for converting relay channels to direct channels;
obtain transmission channel information of a relay channel in use;
obtain a parameter value from the obtained transmission channel information;
determine whether the parameter value is greater than the channel conversion threshold value; and
if it is determined that the parameter value is greater than the channel conversion threshold value, convert the relay channel into a direct channel.

12. The system of claim 11, wherein the audio and video server is configured to adjust down the channel conversion threshold value, if it is determined that the total number of relay channels used by the terminals exceeds the load threshold value.

* * * * *